United States Patent
Motozawa et al.

(10) Patent No.: US 6,454,351 B2
(45) Date of Patent: Sep. 24, 2002

(54) OCCUPANT PROTECTIVE APPARATUS

(75) Inventors: Yasuki Motozawa; Hideaki Nakamichi, both of Saitama (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/732,490

(22) Filed: Dec. 6, 2000

(30) Foreign Application Priority Data

Dec. 6, 1999 (JP) ............................................. 11-346015

(51) Int. Cl.$^7$ ................................................. B60N 2/42
(52) U.S. Cl. ................................ 297/216.16; 296/68.1; 297/216.1
(58) Field of Search ......................... 297/216.1, 216.15, 297/216.16, 216.18, 216.2, 316, 344.1, 216.14, 216.13; 296/68.1; 248/429, 430

(56) References Cited

U.S. PATENT DOCUMENTS

| | | | |
|---|---|---|---|
| 2,959,466 A | 11/1960 | Thompson ................. 296/68.1 |
| 3,001,815 A | 9/1961 | Weber .......................... 296/65 |
| 3,732,944 A | 5/1973 | Kendall ....................... 180/103 |
| 3,897,101 A | 7/1975 | Hess .......................... 296/65 A |
| 3,961,805 A | 6/1976 | Satzinger .................... 280/747 |
| 3,992,046 A | 11/1976 | Braess ....................... 296/65 A |
| 3,998,291 A | 12/1976 | Davis .......................... 180/91 |
| 4,156,472 A | 5/1979 | Kunz ............................ 177/25 |
| 4,832,409 A | 5/1989 | Borlinghaus et al. ....... 297/468 |
| 4,881,473 A | 11/1989 | Borlinghaus et al. ....... 297/473 |
| 5,167,421 A | 12/1992 | Yunzhao ..................... 297/216 |
| 5,286,085 A | 2/1994 | Minami .................... 297/250.1 |
| 5,409,262 A | 4/1995 | McLennan .................. 280/784 |
| 5,437,494 A | 8/1995 | Beauvais ................ 297/216.19 |
| 5,518,271 A | 5/1996 | Bell ............................ 280/806 |
| 5,626,203 A | 5/1997 | Habib ........................ 180/274 |
| 5,636,424 A | 6/1997 | Singer et al. ............. 29/407.01 |
| 5,681,057 A | 10/1997 | Whirley et al. ............. 280/784 |
| 5,685,603 A | 11/1997 | Lane, Jr. ................. 297/216.11 |
| 5,746,467 A | 5/1998 | Jesadanont ................. 296/68.1 |
| 5,810,417 A | 9/1998 | Jesadanont ................. 296/68.1 |
| 6,003,937 A | 12/1999 | Dutton et al. ............ 297/216.1 |
| 6,170,865 B1 | 1/2000 | Barron ........................ 280/735 |
| 6,092,853 A | 7/2000 | Hubbard .................... 296/68.1 |
| 6,116,561 A | 9/2000 | Christopher ................ 248/429 |
| 6,227,597 B1 | 5/2001 | Swann et al. .............. 296/68.1 |

FOREIGN PATENT DOCUMENTS

| | | |
|---|---|---|
| DE | 3424928 | 1/1986 |
| DE | 4323543 C1 | 10/1994 |
| DE | 4415467 C1 | 11/1995 |
| DE | 19938940 | 2/2001 |
| GB | 1043695 | 9/1962 |
| GB | 2340802 A | 3/2000 |
| JP | 05-238287 | 9/1993 |
| JP | 05-246252 | 9/1993 |
| JP | 05-246253 | 9/1993 |
| JP | 7-101354 | 4/1995 |
| JP | 7205733 A | 8/1995 |
| JP | 2000062556 | 2/2000 |
| WO | WO 9422692 | 10/1994 |
| WO | WO 9840238 | 9/1998 |

*Primary Examiner*—Peter M. Cuomo
*Assistant Examiner*—Stephen Vu

(57) ABSTRACT

An apparatus includes one or more seats 1 respectively supported on a vehicle body so as to be movable along the direction of a force acting on the vehicle body in the case of a collision. Each seat 1 includes an inertia mass member, supported on the vehicle body in such a manner that, when the vehicle body stops suddenly in the collision, it continues to move in the direction in which the vehicle body has been advancing until the time just before the collision occurs. Seat 1 also includes a mutually reversing mechanism for connecting together the seat and inertia mass member in such a manner that they can move the seat in the opposite direction to the moving direction of the inertia mass member in the collision.

16 Claims, 4 Drawing Sheets

OCCUPANT PROTECTIVE APPARATUS

BACKGROUND OF THE INVENTION

The present invention relates to an occupant protective apparatus and, in particular, to an occupant protective apparatus which is capable of reducing deceleration to be applied to an occupant when a vehicle collision occurs.

Recently, in order to enhance the effect of occupant protection in a collision, there have been proposed various vehicle body structures in which a deforming mode of the other remaining portions of a vehicle body than the passenger room portion of the vehicle body in a collision is set properly to thereby be able not only to reduce the deceleration of the passenger room portion of the vehicle body but also to prevent the deformation of the other remaining portions of the vehicle body from extending over to the passenger room portion of the vehicle body (see Japanese Patent Unexamined Publication No. Hei. 7-101354).

On the other hand, the deceleration of the occupant constrained to a seat by a seat belt can firstly start at the time when a forward going inertial force acting on the occupant in the collision is received by the seat belt. Here, since the spring action of the seat belt cannot be removed, the inertial force causes the occupant to move forward and the deceleration of the occupant reaches its peak value at the time when the extension of the seat belt reaches its limit. It is generally said that the peak value of the occupant deceleration increases as the moving amount of the occupant due to the inertial force increases and, normally, the peak value of the occupant deceleration becomes higher than the average deceleration of the passenger room portion of the vehicle body. Therefore, in order to reduce an impact to be given against the occupant due to the collision, the deceleration of the vehicle body must be adjusted in such a manner that a delay in the starting time of the occupant deceleration with respect to the vehicle body deceleration can be minimized.

However, it is substantially impossible to connect the occupant to the vehicle body as an integral unit and, especially, in the case of a compact vehicle in which it is difficult to secure a sufficient stroke in the other remaining portions of the vehicle body than the passenger room portion thereof, it is difficult to reduce the occupant deceleration further simply using a conventional occupant protecting method in which the deceleration of the passenger room portion in a collision is reduced by setting the deforming mode of the vehicle body properly.

SUMMARY OF THE INVENTION

The present invention aims at eliminating the drawbacks found in the above-mentioned conventional occupant protective apparatus. Accordingly, it is an object of the invention to provide an occupant protective apparatus which can reduce not only the size of the vehicle body but also the deceleration of the occupant at a further improved manner.

In attaining the above object, according to the invention, there is provided an occupant protective apparatus which comprises: one or more seats (1) respectively supported on a vehicle body so as to be movable along the direction of a force acting on the vehicle body in the case of a collision, and each including a seat belt (3) for constraining an occupant (2) seated on the seat (1); an inertia mass member (in the illustrated embodiment, a battery 5) supported on the vehicle body in such a manner that, when the vehicle body stops suddenly in the collision, it continues to move in the advancing direction of a vehicle in which the vehicle has been advancing until the time just before the collision occurs; and, a mutually reversing mechanism (in the illustrated embodiment, two parallel links 6) for connecting together the seat and inertia mass member in such a manner that they can move the seat in the opposite direction to the moving direction of the inertia mass member in the collision.

According to the present occupant protective apparatus, for example, as soon as a forward running vehicle collides head on with a structure on the road, a backward going acceleration is applied to the seat, so that higher deceleration than the deceleration of the vehicle body is generated in the seat. Therefore, the constraining force of the seat belt for constraining the forward movement of the occupant can be enhanced.

Especially, the present occupant protective apparatus may further include force generating mechanism (in the illustrated embodiment, a stopper 7) for applying a forward going force to the seat after the above-mentioned backward going acceleration is applied. That is, after occurrence of the collision, in case where a forward going force is applied to the seat with a proper time delay with respect to the backward going acceleration, a forward going inertial force acting on the occupant in the collision can be made constant instantaneously, so that the deceleration of the vehicle body and the deceleration of the seat and occupant can be made equal to each other in the early stage of the collision.

DETAILED DESCRIPTION OF THE PREFERRED EMBODIMENTS

Now, description will be given below in detail of the invention with reference to the preferred embodiments of an occupant protective apparatus according to the invention shown in the accompanying drawings.

Figure 1:
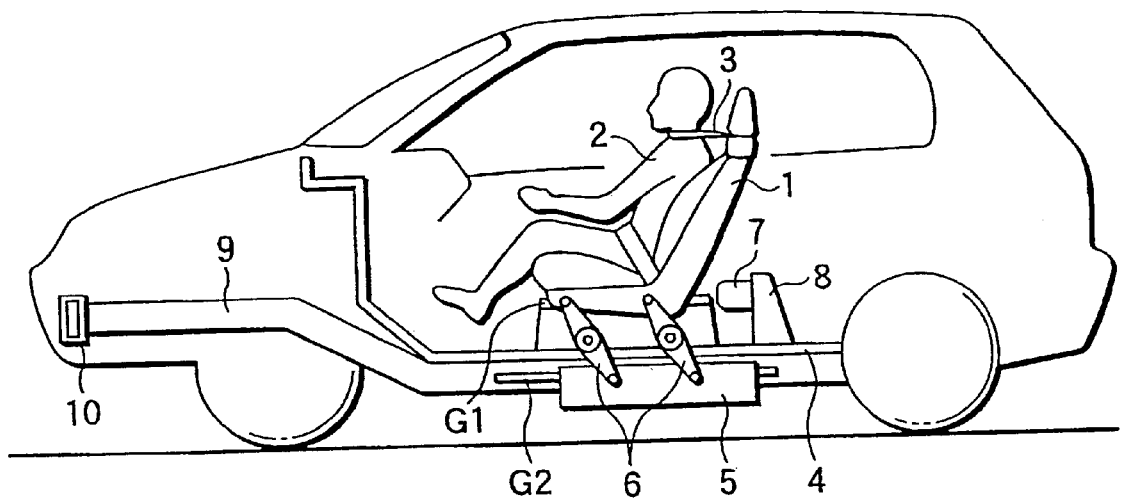
FIG. 1 is a schematic perspective view of a vehicle body to which a first embodiment of an occupant protective apparatus according to the invention is applied.

FIG. 1 show a schematic structure of a vehicle to which is applied a first embodiment of an occupant protective apparatus according to the invention. In the present embodiment, in order to constrain the movement of an occupant 2 with respect to a seat 1, a seat belt 3 is connected to the seat 1. And, the seat 1 is mounted on a floor 4, which forms part of the passenger room portion of a vehicle body of the vehicle, through guide mechanism G1 such as a seat slide rail in such a manner that it can be moved by a certain distance along the advancing direction of the vehicle with respect to the floor 4.

Below the seat 1, there is disposed a battery 5 serving as an inertia mass member through guide mechanism G2 such as a seat slide rail in such a manner that it can be moved by a certain distance along the advancing direction of the vehicle with respect to the floor 4.

The seat 1 and battery 5 are connected together by two parallel links 6 the respective intermediate portions of which are rotatably supported on a member formed integral with the floor 4. Due to the actions of the parallel links 6, the seat 1 and battery 5 are able to move in the mutually opposite directions; that is, in case where one of them moves forward, the other moves backward.

Also, at least one of the seat 1 and battery 5 are locked to the floor 4 through trigger mechanism (not shown) actuatable in accordance with deceleration in such a manner that, in the normal running operation of the vehicle, the seat 1 and battery 5 can be connected to the floor 4 as an integral unit and, only when deceleration of a given value or higher is applied, they can be moved with respect to the floor 4.

On a projecting portion 8 made of a rigid body and formed integral with the floor 4, specifically at a position thereof, which is opposed to the rear surface of the seat 1, there is arranged a stopper 7 which is used to limit the backward movement of the seat 1. This stopper 7, preferably, may be formed of a honeycomb structure member made of aluminum alloy so that, while it is plastically deformed, it can generate a given stress.

Figure 2A:
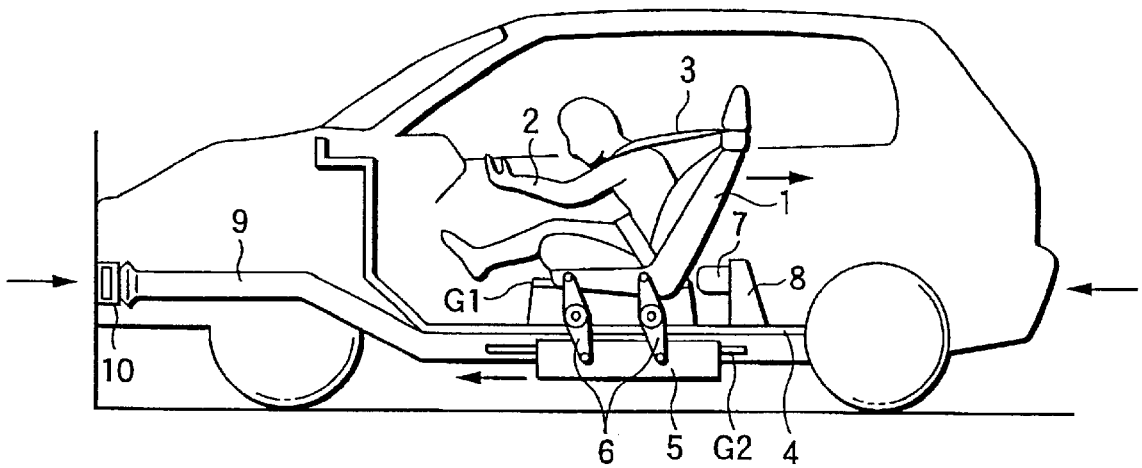
FIG. 2 is an explanatory view of a process in the first embodiment when the collision occurs.
Figure 2B:
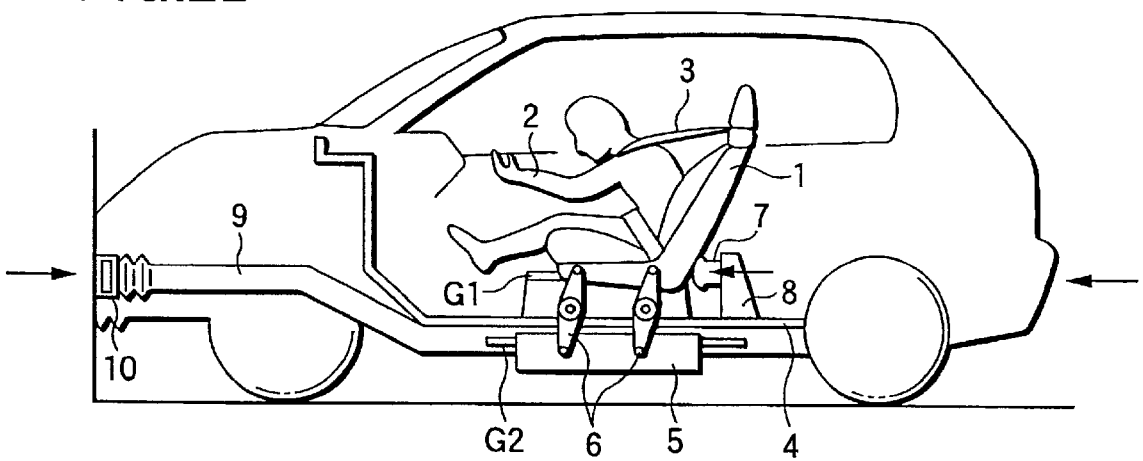
Figure 2C:
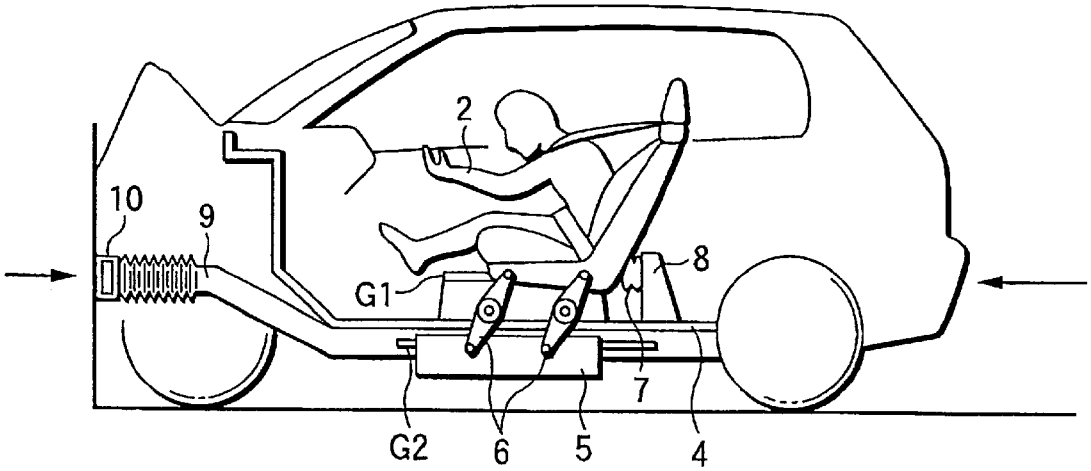
Figure 3:
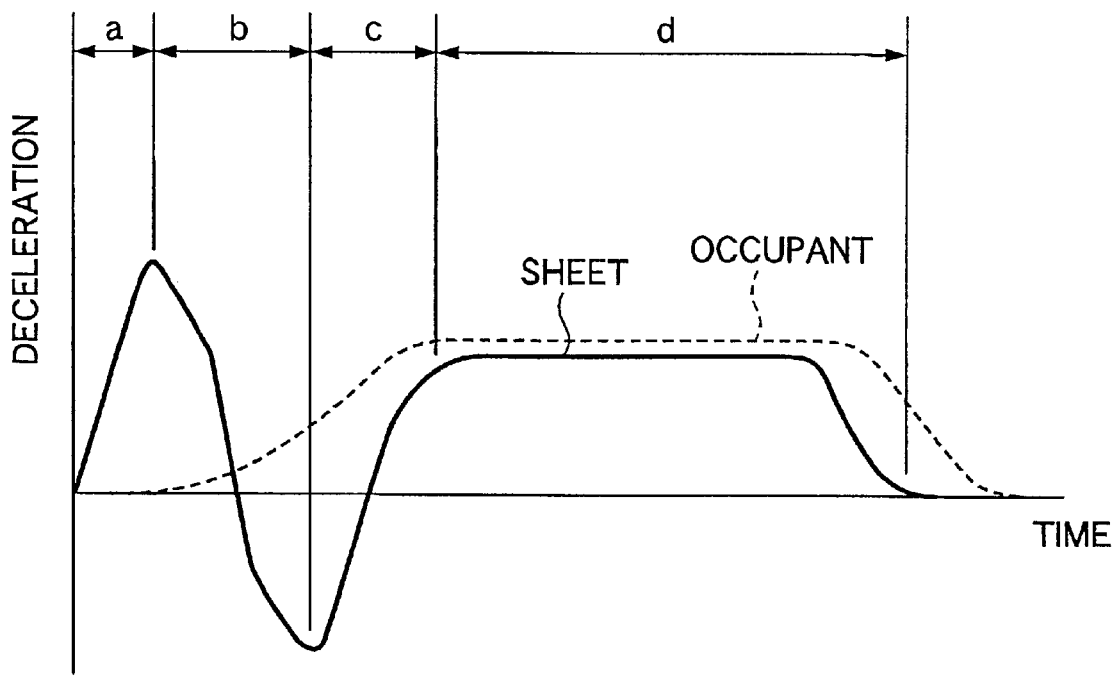
FIG. 3 is a graphical representation of a deceleration waveform obtained when the collision occurs; and, FIG. 4, similarly to FIG. 1, is a schematic perspective view of a vehicle body to which a second embodiment of an occupant protective apparatus according to the invention is applied.

Next, description will be given below of the operation of the occupant protective apparatus of the invention with reference to FIGS. 2 and 3, assuming a case in which a vehicle is collided head on with a structure on the road.

Just at the same time when the collision occurs, a front side member 9, which is formed integral with the floor 4 and extended forwardly from the floor 4, starts to buckle and deform due to an impact load applied to the front bumper beam 10. At this time, the floor 4, which, while receiving deceleration due to a deforming stress produced in the front side member 11, is caused to contract due to the plastic deformation of the front side member 9, continues its forward movement.

On the other hand, the trigger mechanism is removed due to the excessive deceleration that is caused by the collision, so that the locking of the seat 1 and battery 5 to the floor 4 is removed. As a result of this, the seat 1 and battery 5 are both going to continue moving forward due to their respective inertial forces; but, because the inertia mass of the battery 5 is set sufficiently large with respect to the seat 1, and also because the seat 1 and battery 5 are connected together by the two parallel links 6, the battery 5 moves forward with respect to the floor 4 which is going to stop, whereas the seat 1 moves backward with respect to the floor 4 (see FIG. 2-A). Due to the backward movement of the seat 1, in the seat 1, there is generated deceleration which is larger than the deceleration of the floor 4, that is, the passenger room portion of the vehicle body (in FIG. 3, an area shown by a).

During the above process, the occupant 2 is going to continue its forward movement due to an inertial force thereof with respect to the vehicle body (in more concrete, the passenger room portion thereof) which is going to stop due to the collision; but, since backward going acceleration is applied to the seat 1 at the same time when the collision occurs, by the seat belt 3 that is formed integral with the seat 1, the occupant 2 is instantaneously constrained to the seat 1 while generating little relative speed with respect to the floor 4.

In case where the front side member 9 continues its deformation and the battery 5 moves forward, the seat 1 is contacted with the stopper 7. Due to this contact of the seat 1, the stopper 7 is plastically deformed (FIG. 2-B) and, owing to a stress generated at the then time by the stopper 7, a forward going force is applied to the seat 1, so that the seat 1 is accelerated forward with respect to the floor 4 (in FIG. 3, an area shown by b). That is, since the deceleration of the seat 1 is reduced due to the reaction of the stopper 7, the forward inertial force applied to the occupant 2 in the early stage of the collision 2 can be made constant instantaneously. By the way, the rate of variation of the deceleration in this area can be adjusted according to the deforming characteristic of the stopper.

In the late stage of the collision, just at the same time when the stopper 7 is bottomed, the deceleration of the seat 1 increases again (in FIG. 3, an area shown by c); and, after then, the seat 1 and floor 4 continue to decelerate as an integral unit with the deceleration that is determined by the deforming stress of the front side member 9. Also, in this state, because, as described above, the relative speed between the occupant 2 and floor 4 is zero, and also because the constraining load of the seat belt 3 balances well with the deceleration of the vehicle body in the late stage of the collision, the occupant 2 continues to decelerate integrally with the floor 4 (see FIG. 2-C). That is, in this state, the deceleration of the occupant is equal to the deceleration of the vehicle body until the vehicle body stops perfectly (in FIG. 3, an area shown by d).

To reduce the impact given to the occupant 2 in the collision, firstly, it is important to reduce the deceleration of the occupant. In view of this, as described above, in case where there is set a deceleration waveform (which is shown by a solid line in FIG. 3) in which, in the early stage of the collision, the higher deceleration than the average deceleration of the vehicle body is generated in the seat 1 and seat belt 3 for a short period of time, next, the oppositely going acceleration is generated in the seat 1 and seat belt 3 for a short period of time, and, after then, the seat 1 and seat belt 3 are allowed to decelerate with the average vehicle body deceleration, when compared with a vehicle which does not incorporate therein the present occupant protective apparatus, the deceleration of the occupant can be reduced in such a manner as shown by a broken line in FIG. 3, assuming that the respective vehicle bodies of the two vehicles are deformed in the same amount.

In order to enhance the effects of the invention structured in the above-mentioned manner, preferably, the deforming characteristic of the front side member 9, the elastic characteristic of the seat belt 3, the inertia mass of the battery 5, the moving amount of the seat 1, and the deforming characteristic of the stopper 7 may be set properly such that, at the time when the relative speed between the seat 1 and floor 4 becomes zero as well as the deceleration of the seat 1 and the deceleration of the floor 4 are equal to each other, the relative speed between the occupant 2 and floor 4 can approach zero as much as possible and the constraining load of the seat belt 3 can balance as equally as possible with the vehicle body deceleration in the late stage of the collision.

Figure 4:
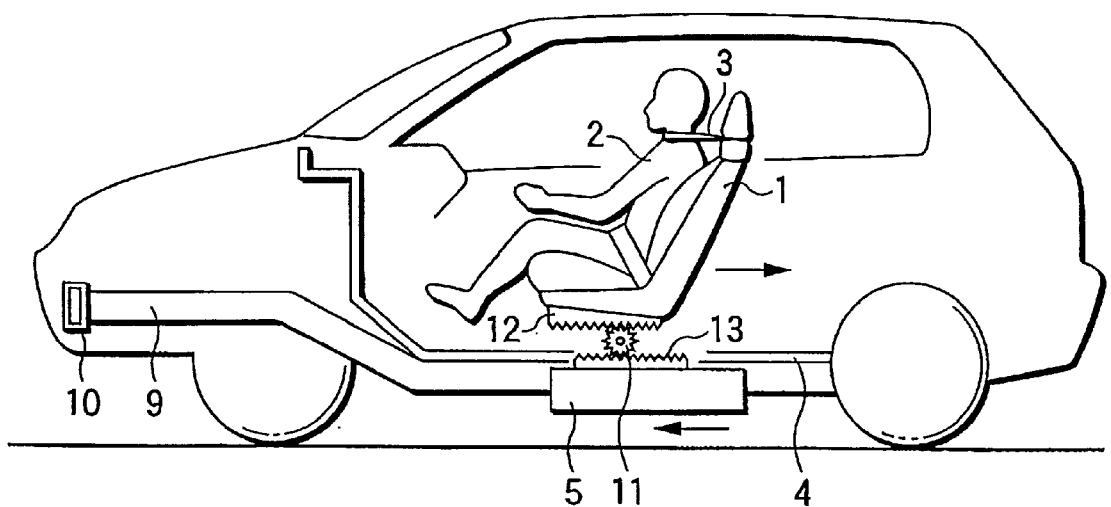
Figure 5:
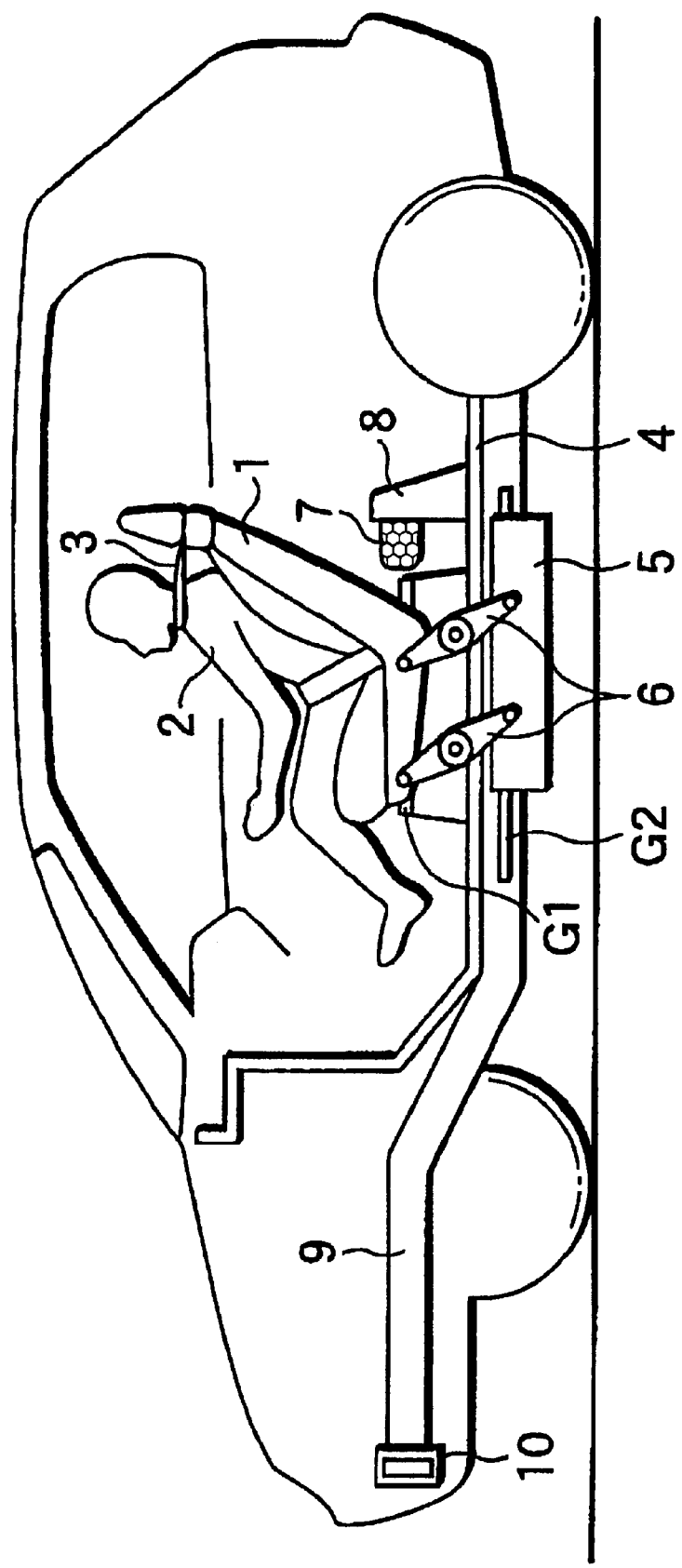
FIG. 5 is another embodiment, showing a stopper including a honeycomb structure.

Now, FIG. 4 shows a second embodiment of an occupant protective apparatus according to the invention. In the present embodiment, as a mutually reversing mechanism for moving the seat 1 and battery 5 in their mutually opposite directions, there are used a pinion 11 which is rotatably supported on the floor 4, and rack gears 12, 13 which are respectively fixed to the seat 1 and battery 5, while the rack gears 12, 13 are meshingly engaged with the upper and lower sides of the pinion 11 respectively. In the second embodiment as well, in the case of a collision, when the battery 5 is moved forward, the seat 1 is moved backward. That is, there can be obtained a similar operation to the previously described first embodiment. FIG. 5 is another embodiment, showing a stopper including a honeycomb structure.

By the way, the inertia mass member is not limited to the above-mentioned battery 5 but it is also possible to use other member such as an engine or a transmission, provided that it can secure given inertia mass and, in the collision, it can be moved in the advancing direction of the vehicle due to an inertial force.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As has been described heretofore, according to the invention, in the collision, the inertia mass member is moved in the acting direction of the collision load to thereby accelerate the seat with a seat belt in the opposite direction to the advancing direction of the vehicle, so that the higher deceleration than the vehicle body deceleration is generated in the seat and seat belt in the early stage of the collision to thereby enhance the constraining force of the occupant and, next, the acceleration going in the opposite direction to the direction of the above acceleration is generated by the force generating mechanism in the seat and seat belt to thereby control an increase in the inertial force of the occupant going to move forward, whereby, in the late stage of the collision, the deceleration of the vehicle body can be made equal to the deceleration of the seat and occupant. Therefore, according to the invention, a deceleration waveform preferable for reduction of the occupant deceleration can be generated in the seat and seat belt, which makes it possible to reduce greatly the peak value of the occupant deceleration with a smaller vehicle body deforming amount than in the conventional occupant protective apparatus. Also, since the moving amount of the occupant within the passenger room with respect to the vehicle body can be minimized, it is possible to reduce the possibility of a secondary collision in which the occupant can be butted against structures existing within the passenger room and can be thereby damaged.

What is claimed is:

1. An occupant protective apparatus comprising:
   a seat supported on a vehicle body so as to be movable along a direction of a force acting on said vehicle body in the case of a vehicle collision, said seat including a seat belt for constraining an occupant seated on said seat;
   an inertia mass member supported on said vehicle body so as to be continuously movable, when said vehicle body stops suddenly in the vehicle collision, in the direction in which said vehicle body has been advancing until the time just before said collision occurs; and,
   a mutually reversing mechanism connecting said seat and said inertia mass member together so as to move said seat in the opposite direction to the moving direction of said inertia mass member when said collision occurs, wherein said mutually reserving mechanism is a link member connecting said seat and said inertia mass member.

2. The occupant protective apparatus as set forth in claim 1, wherein said inertia mass member is a battery.

3. The occupant protective apparatus as set forth in claim 1, further comprising:
   a guide rail attached to said vehicle body so as to make, said inertia mass member being slidable along said guide rail.

4. An occupant protective apparatus comprising:
   a seat supported on a vehicle body so as to be movable along a direction of a force acting on said vehicle body in the case of a vehicle collision, said seat including a seat belt for constraining an occupant seated on said seat;
   an inertia mass member supported on said vehicle body so as to be continuously movable, when said vehicle body stops suddenly in the vehicle collision, in the direction in which said vehicle body has been advancing until the time just before said collision occurs;
   a mutually reversing mechanism connecting said seat and said inertia mass member together so as to move said seat in the opposite direction to the moving direction of said inertia mass member when said collision occurs; and
   a stopper attached to said vehicle body and being plastically deformable when said stopper undergoes at least a predetermined force.

5. The occupant protective apparatus as set forth in claim 4, wherein said stopper is made of an aluminum alloy.

6. The occupant protective apparatus as set forth in claim 4, wherein said stopper has a honeycomb structure.

7. An occupant protective apparatus comprising:
   a seat supported on a vehicle body so as to be movable along a direction of a force acting on said vehicle body in the case of a vehicle collision, said seat including a seat belt for constraining an occupant seated on said seat;
   an inertia mass member supported on said vehicle body so as to be continuously movable, when said vehicle body stops suddenly in the vehicle collision, in the direction in which said vehicle body has been advancing until the time just before said collision occurs;
   a mutually reversing mechanism connecting said seat and said inertia mass member together so as to move said seat in the opposite direction to the moving direction of said inertia mass member when said collision occurs; and
   a force generating mechanism for applying a force to said seat in the opposite direction to the moving direction of said seat in said collision.

8. The occupant protective apparatus as set forth in claim 7, wherein said force generating mechanism is a plastically deformable stopper.

9. The occupant protective apparatus as set forth in claim 8, wherein said stopper comprises an aluminum alloy.

10. The occupant protective apparatus as set forth in claim 8, wherein said stopper comprises a honeycomb structure.

11. The occupant protective apparatus as set forth in claim 7, wherein said inertia mass member is a battery.

12. The occupant protective apparatus as set forth in claim 7, wherein said mutually reversing mechanism comprises a link member connecting said seat and said inertia mass member.

13. The occupant protective apparatus as set forth in claim 7, further comprising:
    a guide rail attached to said vehicle body wherein said inertia mass member is slidable along said guide rail.

14. The occupant protective apparatus as set forth in claim 4, wherein said inertia mass member comprises a battery.

15. The occupant protective apparatus as set forth in claim 4, wherein said mutually reversing mechanism comprises a link member connecting said seat and said inertia mass member.

16. The occupant protective apparatus as set forth in claim 4, further comprising:
    a guide rail attached to said vehicle body, said inertia mass member being slidable along said guide rail.

* * * * *